(12) United States Patent
Shicht et al.

(10) Patent No.: US 11,508,031 B2
(45) Date of Patent: Nov. 22, 2022

(54) WARPING DATA

(71) Applicant: SAMSUNG ELECTRONICS CO., LTD., Suwon-si (KR)

(72) Inventors: Yuval Shicht, Tel-Aviv (IL); Eyal Rosin, Rosh HaAyin (IL); Michael Dinerstein, Rehovot (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 17/123,486

(22) Filed: Dec. 16, 2020

(65) Prior Publication Data

US 2022/0188970 A1    Jun. 16, 2022

(51) Int. Cl.
  *G06T 3/00*        (2006.01)
  *G06F 12/123*      (2016.01)
  *G06T 1/60*        (2006.01)
  *G06F 12/0862*     (2016.01)

(52) U.S. Cl.
  CPC ........ *G06T 3/0093* (2013.01); *G06F 12/0862* (2013.01); *G06F 12/123* (2013.01); *G06T 1/60* (2013.01); *G06F 2212/302* (2013.01)

(58) Field of Classification Search
  CPC ..... G06T 3/0093; G06T 1/60; G06F 12/0862; G06F 12/123; G06F 2212/302
  USPC ....................................................... 345/646
  See application file for complete search history.

(56) References Cited

U.S. PATENT DOCUMENTS

| 8,447,134 | B1 | 5/2013 | Reader et al. | |
| 8,482,573 | B2 | 7/2013 | Mallett | |
| 2004/0156558 | A1* | 8/2004 | Kim | G06T 3/0081 |
| | | | | 382/276 |
| 2016/0210231 | A1* | 7/2016 | Huang | G06F 12/084 |
| 2017/0256025 | A1* | 9/2017 | Abraham | G06T 15/005 |

OTHER PUBLICATIONS

Pierce Greisen, et al., "Spatially-Varying Image Warping: Evaluations and VLSI Implementations," International Federation for Information Processing, pp. 64-87, 2013.

* cited by examiner

*Primary Examiner* — Jennifer Mehmood
*Assistant Examiner* — Kim Thanh T Tran
(74) *Attorney, Agent, or Firm* — F. Chau & Associates, LLC

(57) ABSTRACT

A method of warping data includes the steps of providing a set of target coordinates $\bar{x} \in \mathbb{R}^N$, calculating, by a warping engine, source coordinates $\bar{x}' \in \mathbb{R}^N$ for the target coordinates $\bar{x} \in \mathbb{R}^N$, requesting, by the warping engine, data values for a plurality of source coordinates from a cache, and computing, by the warping engine, interpolated data values for each $\bar{x}$ in a neighborhood of $\bar{x}'$ from the data values of the source coordinates returned from the cache. Requesting data values from the cache includes notifying the cache that data values for a particular group of source points will be needed for computing interpolated data values for a particular target point, and fetching the data values for the particular group of source points when they are need for computing interpolated data values for the particular target point.

19 Claims, 5 Drawing Sheets

(a)

(b)

(c)

(d)

WARPING DATA

BACKGROUND

Technical Field

Embodiments of the present disclosure are directed to the technical field of data position manipulation.

Discussion of the Related Art

Data manipulation can be achieved by a positional transformation between a source and a target collection of data points. The data can be of any dimension, can contain any data type, and can be of any shape, although it is assumed to be stored in a circumscribed hyperrectangle. Common uses are for image processing, where the data points are pixels in an image, to fix image distortions or to obtain a surround view, etc. However, embodiments of this disclosure are not limited to image pixel data or to a specific task, but are applicable to warping any data type for any purpose and of any shape.

The action of mapping the position of data points to data points, with minimal to no change in their value, is pure warping. Mapping can be performed by any method, such as a lookup-table, such as a grid, a mathematical function, etc.

When such mappings are unconstrained, the order of accessing data points to perform the transformation between a source and target data points may be near-random, and as such the transformation is prone to low performance, increased band-width and high power consumption.

SUMMARY

Embodiments of the disclosure can perform unconstrained data warping while minimizing the impact on the implementation that random data access has on the performance, power, or area.

A system according to an embodiment of the disclosure includes a warping processing unit that includes a warping engine and a fully-set-associative cache that stores the source data points. The fully-set-associative cache includes features that boost its performance and robustness, such as (1) a smart pre-fetch mechanism to reduce the latency for fetching data points, and (2) a robust way to tag cache lines that eliminates the effect of the order in the main memory on cache lines tagging.

According to an embodiment of the disclosure, there is provided a computer-implemented method of warping data, including providing a set of target coordinates $\bar{x} \in \mathbb{R}^N$, calculating, by a warping engine, source coordinates $\bar{x}' \in \mathbb{R}^N$ for the target coordinates $\bar{x} \in \mathbb{R}^N$, requesting, by the warping engine, data values for a plurality of source coordinates from a cache; and computing, by the warping engine, interpolated data values for each $\bar{x}$ in a neighborhood of $\bar{x}'$ from the data values of the source coordinates returned from the cache. Requesting data values from the cache includes notifying the cache that data values for a particular group of source points will be needed for computing interpolated data values for a particular target point, and fetching the data values for the particular group of source points when they are need for computing interpolated data values for the particular target point.

According to a further embodiment of the disclosure, the plurality of source data points is a hyperrectangle of size $p_1 \times \ldots \times p_N$, $p_1, \ldots, p_N \geq 1$, N>1, centered at $\bar{x}'$.

According to a further embodiment of the disclosure, the cache comprises a plurality of lines, and each line stores a hyperrectangle of size $n_1 \times \ldots \times n_N$ of D-dimensional data points, where D, $n_1, \ldots, n_N \geq 1$, and the cache's is fully-set-associative where each cache line can be stored in any cache location.

According to a further embodiment of the disclosure, requesting data values from the cache includes calculating a number of cache lines K, wherein K depends on a maximal size of the group of source coordinates and a cache line size ($n_1 \times \ldots \times n_N$), for a current request, calculating a tag for each cache line, performing a lookup operation for each tag in a tag array of the cache, wherein it is determined whether any cache lines are missing, using the tag for a cache line to find a corresponding location of a data value in an internal memory of the cache, and returning the data value to the warping engine.

According to a further embodiment of the disclosure, the method includes sending physical addresses of missing cache lines to a main memory; and writing data returned from main memory to the cache's internal memory in an available cache entry according to a replacement policy.

According to a further embodiment of the disclosure, the method includes comparing tags of missing cache lines to missing cache lines that have already been requested and are being retrieved, and keeping tags that correspond to lines that have already been requested in a queue, wherein the physical addresses of the missing cache-lines, for those of tags that are not in the queue, are sent to the main memory.

According to a further embodiment of the disclosure, the method includes calculating a tag, when the tag is a virtual tag.

According to a further embodiment of the disclosure, the replacement policy is one of a first-in-first-out or a least-recently-used policy.

According to another embodiment of the disclosure, there is provided a system for warping data that includes a warping engine that includes an output generator that generates a plurality of target coordinates $\bar{x} \in \mathbb{R}^N$, a mapper that that calculates source coordinates $\bar{x}' \in \mathbb{R}^N$ for a plurality of target coordinates $\bar{x} \in \mathbb{R}^N$, and an interpolator that computes interpolated data values for each $\bar{x}$ in a neighborhood of $\bar{x}'$ from the data values of the source coordinates, a cache that receives requests for data values of the source coordinates from the warping engine, and a main memory that provides data values of the source coordinates to the cache when there is a cache miss for those data values. The plurality of source data points is a hyperrectangle of size $p_1 \times \ldots \times p_N$, $p_1, \ldots, p_N \geq 1$, N>1, centered at $\bar{x}'$, and the cache comprises a plurality of lines, and each line stores a hyperrectangle of size $n_1 \times \ldots \times n_N$ of D-dimensional data points, where D, $n_1, \ldots, n_N \geq 1$, and the cache's is fully-set-associative where each cache line can be stored in any cache location.

According to a further embodiment of the disclosure, the warping engine notifies the cache that data values for a particular group of source points will be needed for computing interpolated data values for a particular target point, and fetches the data values from the cache for the particular group of source points when they are need for computing the interpolated data values for the particular target point.

According to a further embodiment of the disclosure, in response to the warping engine requesting data values from the cache, the cache calculates a number of cache lines K, wherein K depends on a maximal size of the group of source coordinates and a cache line size ($n_1 \times \ldots \times n_N$ for a current request, calculates a tag for each cache line, performs a lookup operation for each tag in a tag array of the cache, wherein it is determined whether any cache lines are missing, uses the tag for a cache line to find a corresponding location of a data value in an internal memory of the cache, and returns the data value to the warping engine.

According to a further embodiment of the disclosure, in response to the warping engine requesting data values from the cache, the cache sends physical addresses of missing cache lines to a main memory; and writes data returned from main memory to the cache's internal memory in an available cache entry according to a replacement policy.

According to a further embodiment of the disclosure, in response to the warping engine requesting data values from the cache, the cache compares tags of missing cache lines to missing cache lines that have already been requested and are being retrieved, and keeps tags that correspond to lines that have already been requested in a queue, wherein the physical addresses of the missing cache-lines, for those of tags that are not in the queue, are sent to the main memory.

According to a further embodiment of the disclosure, in response to the warping engine requesting data values from the cache, the cache calculates a tag, when the tag is a virtual tag.

According to a further embodiment of the disclosure, the replacement policy is one of a first-in-first-out or a least-recently-used policy.

According to another embodiment of the disclosure, there is provided a non-transitory program storage device readable by a computer, tangibly embodying a program of instructions executed by the computer to perform method steps for warping data.

DETAILED DESCRIPTION

Positional transformation of data introduces major obstacles in terms of performance. When applying a transformation that has no constraints, the computation time can increase dramatically if no measures are taken to prevent that from happening. This occurs when a transformation that maps the position of data points between a source order and a target order requires accessing the source data points in an order that is very different than their original order. In the worst case, that order can be nearly random.

Figure 1:
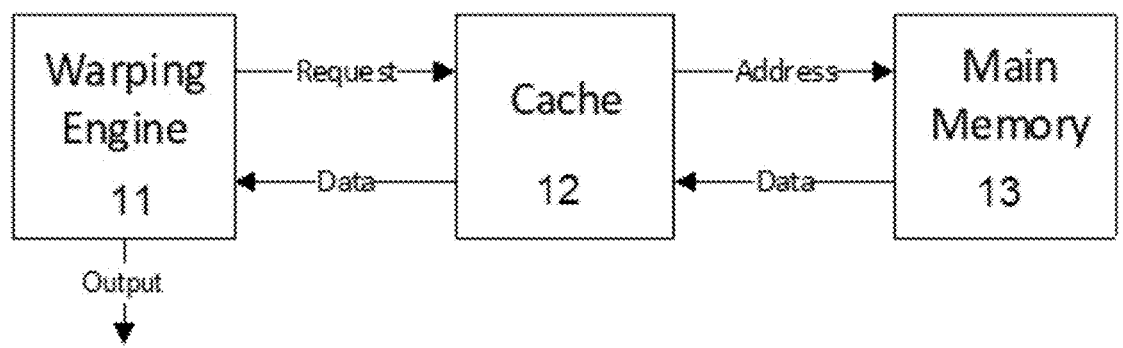
FIG. 1 depicts a general overview of a system according to an embodiment of the disclosure.

According to an embodiment, consider a system 10, illustrated in FIG. 1, that includes a dedicated processing unit ii that is a warping engine, an internal cache 12 and a main memory 13, where the main memory may have its own L2/L3 cache. The warping engine 11 requests, via the cache 12, data from memory 13, which is then processed and output. The implementation of the processing unit determines the performance of the system, and its power and area demands.

Warping Engine

Figure 2:
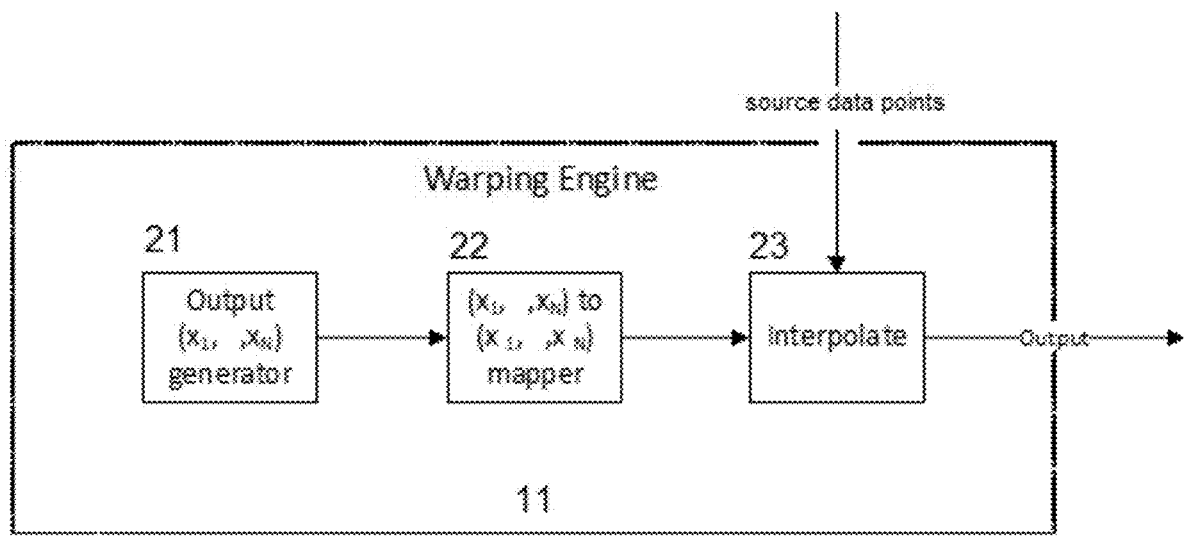
FIG. 2 illustrates a general scheme of a warping agent according to an embodiment of the disclosure.

According to an embodiment, warping is achieved by applying a transformation between the source location of data points and their target location. FIG. 2 illustrates a general scheme of a warping engine according to an embodiment of the disclosure. A procedure of a warping engine 11 according to an embodiment includes three stages: an output generator stage 21, a mapper stage 22, and an interpolator stage 23.

An output generator stage 21 according to an embodiment generates a stream of output coordinates that will be converted to input coordinates by the mapper 22. In 2D image processing it will typically generate the coordinates of a 2D image in raster-scan order. However, in a general case this might not always be true. Even in image processing, it is possible to not perform warping on all of the coordinates of the frame, by, for example, cropping the frame.

In a mapper stage according to an embodiment, the source coordinates $\bar{x}' \in \mathbb{R}^N$ are calculated for target coordinates $\bar{x} \in \mathbb{R}^N$. This calculation can be defined by a function $f: \mathbb{R}^N \to \mathbb{R}^N$ and can be performed in various ways. Common practices are to (a) calculate $f$ directly, or (b) a-priori sample a grid of points of $f$ and use these samples to interpolate $\bar{x}'$ values. The order of the target coordinates can be calculated internally, or received from an external source.

In an interpolator stage according to an embodiment, a group of source data points, such as a hyperrectangle of size $p_1 \times \ldots \times p_N$, $p_1, \ldots, p_N \geq 1$, centered at $\bar{x}'$, is used to compute the interpolated value for $\bar{x}$. Any type of computation can be applied to the $p_1 \times \ldots \times p_N$ source data points to perform this interpolation, for example an N-cubic or multi-linear interpolation, a nearest-neighbor selection, etc. In some cases this computation can also include the coordinates $\bar{x}$, or $\bar{x}'$ or both.

Figure 3:
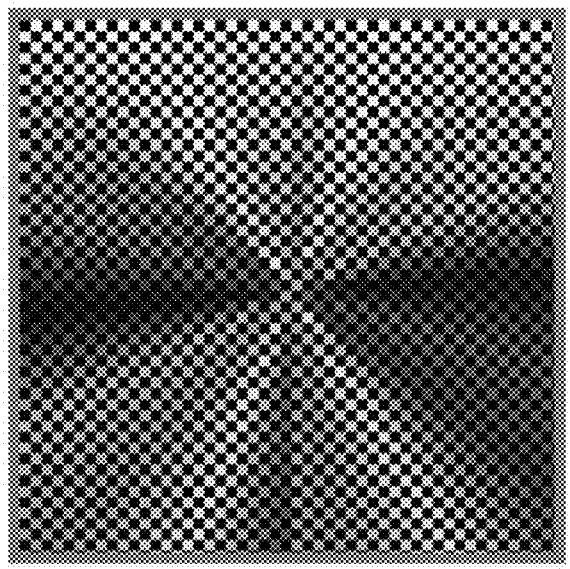
FIG. 3 illustrates several complex transformations between source data points (a) and target data points (b), (c) and (d), according to embodiments of the disclosure.
Figure 3:
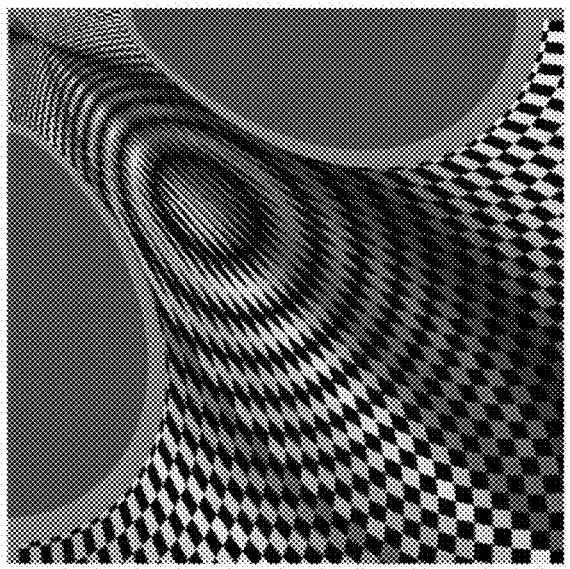
Figure 3:
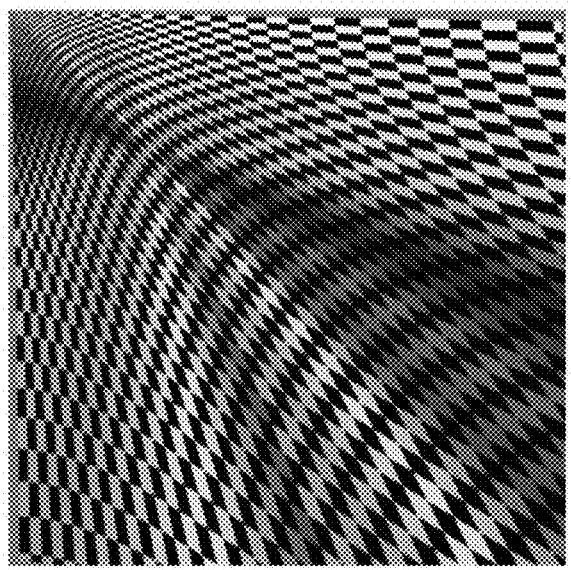
Figure 3:
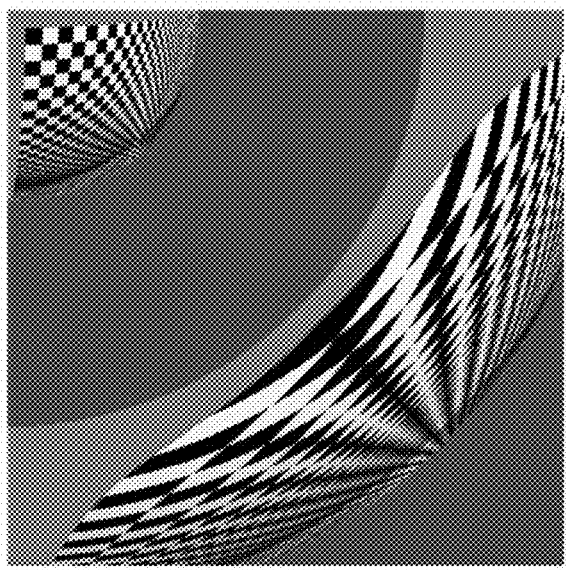

FIG. 3 illustrates exemplary complex transformations between source data points (a) and target data points (b), (c) and (d).

Cache Architecture

A cache's architecture determines the performance of a complete solution according to an embodiment, since the cache is the single component that is transformation-dependent. This dependency is reflected by the order of the requests for source data points.

A cache according to an embodiment stores data in M lines, where each line stores a hyperrectangle of size $n_1 \times \ldots \times n_N$ of D-dimensional data points, where D, $n_1, \ldots, n_N \geq 1$. A cache entry is a specific location in the cache, with a specific position in the cache's SRAM, which can store different cache lines during processing time, but not in parallel. For example, an RGB pixel is a 3-dimensional data point in a 2D or 3D source data. The cache lines are non-overlapping, and the source data-points stored in each line are aligned to the circumscribed hyperrectangle of the source's data. For example, for m=1 and n=8 and a 2D source, data points located at (0,0) through (7,0) will be stored in the same cache line, whereas data points (8,0) through (15,0) will be stored in another cache line. In this example, a 2D source of size 1000×500 data points requires 128×500 cache lines to be covered.

According to an embodiment, to obtain a transformation with optimal robustness, the cache's architecture is fully-set-associative. In this architecture, every cache line can be stored in every cache entry and thus it is fully flexible.

A warping engine according to an embodiment requests $p_1 \times \ldots \times p_N$ data points, along with their coordinates $\bar{x}'$, from the source, and the cache's objective is to provide these data points to the warping engine. The position of the $p_1 \times \ldots \times p_N$ hyperrectangle is not necessarily aligned with the cache's lines, so the cache may need a few cache lines to fulfill a request from the Warping Engine.

Figure 4:
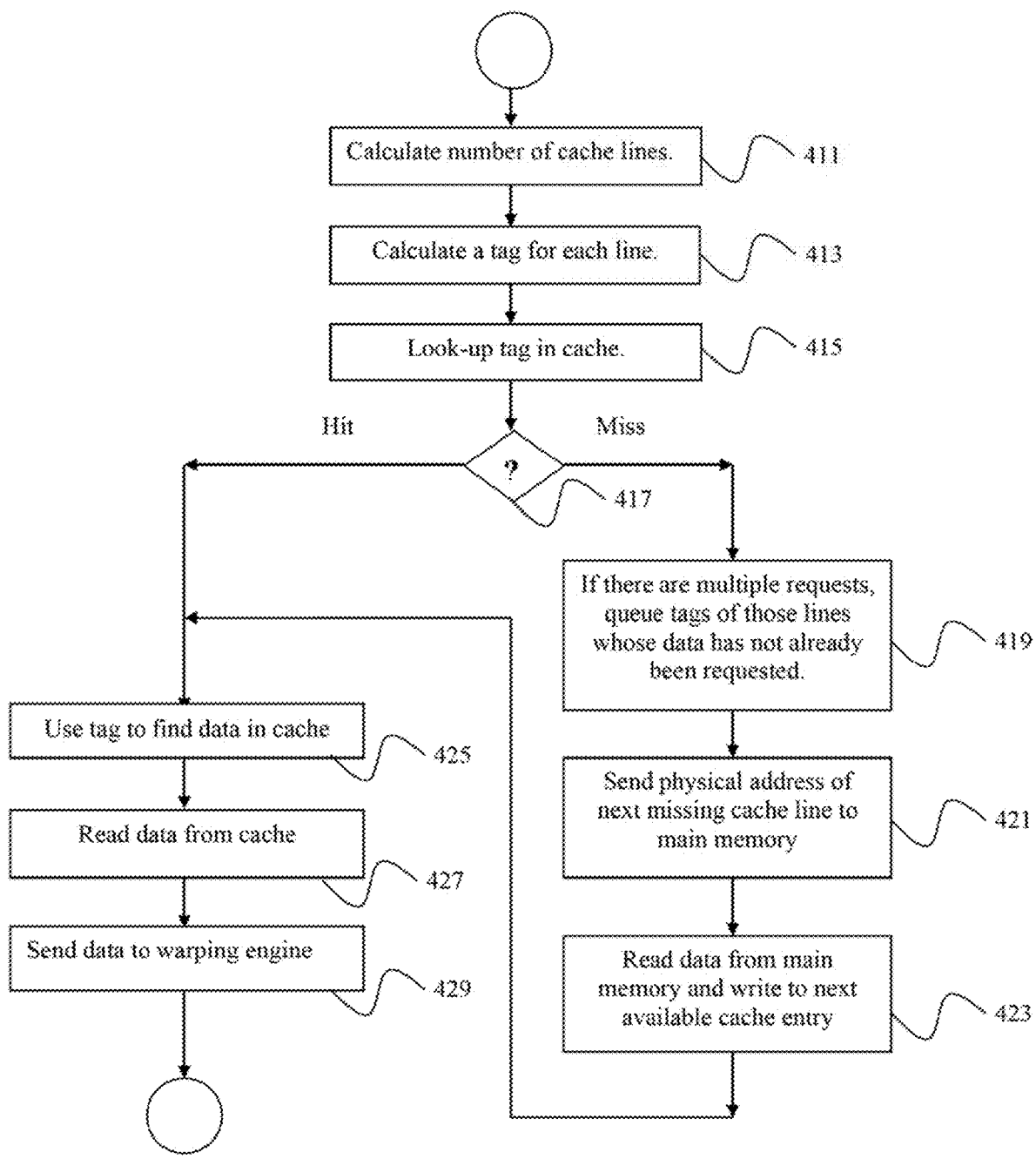
FIG. 4 illustrates an operation scheme of a cache according to an embodiment of the disclosure.

FIG. 4 illustrates an operation scheme of a cache according to an embodiment of the disclosure. Referring now to the figure, upon receiving a request with $\bar{x}'$ coordinates and size $p_1 \times \ldots \times p_N$, a cache according to an embodiment performs the following actions.

At step 411, a number of cache lines K is calculated, where K depends on the maximal size of $p_1 \times \ldots \lambda\; p_N$ and the cache line size ($n_1 \times \ldots \times n_N$), for the current request. The number of cache lines can differ between requests.

At step 413, a tag is calculated for each cache line. For a fully-set-associative cache, the physical address is also the tag in the cache.

At step 415, a lookup operation is performed in the cache's tag-array, to check whether any cache lines are missing. The tags of missing cache-lines that are not in a queue are put inside the queue.

If, at step 417, some cache lines are missing, there is a cache miss. If there are multiple outstanding requests, to reduce latency between the cache and the main memory, at step 419, the tags of missing cache lines are compared to those that were already requested and are being retrieved; those tags that correspond to line that were already requested are kept in the queue. Then, the physical addresses (tags) of these missing cache-lines, for those of tags that are not in the queue, are sent to the main memory at step 421. When the data is returned from main memory at step 423, it is written to the cache's internal memory in an available cache entry according to a replacement policy.

When no cache lines are missing, i.e., there is a cache hit, then the tags are used to find the corresponding location of the data in the internal memory of the cache at step 425, the data is read from the cache's internal memory at step 427, and the data is delivered to the warping engine at step 429 to complete the request.

Cache Entry Replacement Policy

According to an embodiment, when data is missing in the cache, the data is fetched from the main memory (or an L2/L3 cache) when required. If not all of the cache entries are occupied, the data is usually placed in the next available cache entry. However, if all of the cache lines are occupied, then a replacement policy should be taken into consideration. A common replacement policy of a fully-set-associative cache is first-in-first-out (FIFO). However a least-recently-used (LRU) mechanism can also be employed, to make sure that active cache lines are not removed from the cache.

A fully-set-associative cache according to an embodiment can work with a hierarchical LRU that keeps groups of recently used lines and replaces the least recently used cache line in the least recently used group. A hierarchical LRU according to an embodiment is an alternative for having an LRU in hierarchies, that groups cache entries and associates an LRU for the level of groups and also for the lines in the group independently.

Data Pre-Fetching

A transformation according to an embodiment is data-independent, and relies only on the coordinates of the data points. Therefore, a transformation can be computed ahead of time to notify the cache that some data will be required in the future. The purpose of a pre-fetch request is to reduce the read latency from the main memory.

When employing a mechanism according to an embodiment, the cache can handle two types of requests from a warping engine: (1) pre-fetch requests; and (2) data requests. The warping engine generates requests, and sends the requests on two interfaces: the request is treated as pre-fetch request if it comes on the pre-fetch interface, or as a data-request if it comes on the data-requests interface, which is the output of the requests queue (see below).

According to an embodiment, a pre-fetch request is completed when the data is either already in the cache, or if it is on its way from the main memory. However, to complete a data request, the cache should also deliver the requested data points to a warping engine.

Since a pre-fetch request can be fulfilled without actually transferring data from the cache to a warping engine, a pre-fetch request is by definition completed ahead of a data request. To reduce duplicate computations, a warping engine according to an embodiment can refrain from calculating the requests twice by storing the pre-fetch requests in a delayer, and using this delayer's output as the data requests from the cache. Note that he requests FIFO is only used in such cases to reduce duplicate calculations, i.e. if the calculations are complex.

Figure 5:
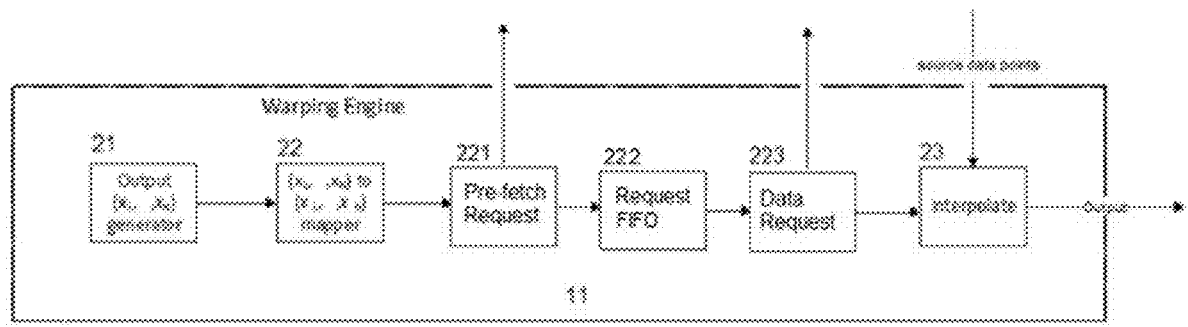
FIG. 5 illustrates pre-fetch and data requests from a cache according to an embodiment of the disclosure.

A pre-fetch mechanism according to an embodiment is illustrated in FIG. 5. FIG. 5 illustrates how the warping engine of FIG. 2 is modified by pre-fetching. In FIG. 5, only those component not already described with respect to FIG. 2 will be described. Referring to FIG. 5, a request for point $(x'_1, \ldots, x'_n)$ of size $p_1 \times \ldots \times p_N$ is received at step 221, and a pre-fetch request is generated. The pre-fetch request is placed in a request FIFO data structure 222, such as a pre-fetch queue. The cache pops data-requests at step 223 when they can be fulfilled, i.e. when there's a hit. Until then, more data-requests can be put in this pre-fetch FIFO 222. Note that the cache serves both pre-fetch and data requests independently of each other and in parallel, and most of the time it serves different pre-fetch and data requests.

The pre-fetch request is handled by steps 411 to 417 of the cache illustrated in FIG. 4. If there is a cache hit at step 417 for a pre-fetch request then the cache moves on to serving the next pre-fetch request. Referring back to FIG. 4, The difference between serving a pre-fetch request and a data request is that after step 417, in case of a pre-fetch hit, the cache's pre-fetch mechanism moves back to its initial stage to serve a new pre-fetch request; and the same after step 421, in case of a pre-fetch miss. The pre-fetch requests servicing mechanism does not wait for data to be back from the main memory before moving to the next request.

A data request according to an embodiment has a higher priority, in terms of being served by the cache, than a pre-fetch request, because data requests are used to perform the current output calculation, whereas pre-fetch requests are used for future outputs. Consequently, upon a miss in both type of requests, an arbiter according to an embodiment gives priority to fetching missing cache lines of data requests.

Virtual Tagging

According to an embodiment, mapping of cache lines is performed regardless of their position in the main memory. Mapping of cache lines is based only on their position in the circumscribed hyperrectangle of the source. This allows the cache entries to be independent of the order in the main memory and increases robustness.

Virtual tagging refers to method in which the physical address are not necessarily used as a tag in the cache, that will in turn be used to perform a look-up operation.

When using virtual tags, the tags are no longer identical to the physical address. In some cases this also means that the required bit-width for the tags and lookup operations are much smaller. An example would be to give an increasing index to each cache line as its tag value.

Figure 6:
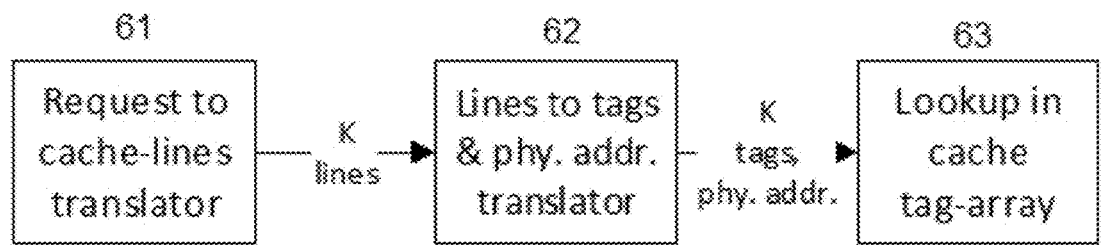
FIG. 6 is a block diagram of a cache line that translates to tags and physical addresses, according to an embodiment of the disclosure.

FIG. 6 illustrates how a cache line is translated into tags and physical addresses. Referring to the figure, step 61 processes a request from given coordinates and size and translates them into up to K cache lines; step 62 translates these K cache lines to their tags; and then step 63 performs a look-up operation in the cache, using these tags. These steps would replace steps 411 to 415 of FIG. 4.

Effects of Warping with a Fully-Set-Associative Cache

According to an embodiment, performing unconstrained data warping is challenging task and its demands can be very high if the implementation is not optimal. An optimal implementation can be characterized by:

1. High performance: high hit-rate in the cache.
2. Low power: minimal amount of reading same-data from the main memory.
3. Low area: minimal amount of SRAM in the cache.

Using a dedicated cache simulator, embodiments of the disclosure achieved the following results for a cache of ~100K at 4.5-byte per data point when applying various warping transformations on an RGB image, but not necessarily the same transformation for every resolution:

| Resolution (cache %) | Latency Overhead (%) | Hit Rate (%) | Bandwidth (frames) | Bandwidth Overhead (%) |
|---|---|---|---|---|
| 1920 × 960 (5.3%) | 7%–34% | 98.47%–99.11% | 0.51–0.89 | 1%–2% |
| 3840 × 1920 (1.3%) | 15%–42% | 98.53%–99.48% | 0.38–0.91 | 0%–30% |
| 4672 × 2336 (0.9%) | 14%–39% | 98.57%–99.84% | 0.13–0.96 | 0%–99% |

In the table: the % resolution refers to the percentage of a frame that can be stored in the cache; the latency overhead refers to how much more it took to process the frame, in comparison to an ideal system that never suffers from delays because of cache misses; the hit rate is the percentages of cache request that are hits; the bandwidth units are per each frame that is processed, and also depends on the frame-rate (for example, if the first resolution is 30 fps, then 4.5×1920× 960×30×0.51≈127 MBps will be required, or up to 222 MBps (for 0.89)); and the bandwidth overhead means how much more bandwidth was consumed, in comparison to an ideal system that would never fetch a data point more than once and does not fetch unnecessary data. The results above show that even when the resolution increases, which means that the cache can store less data of the image, there is low to insignificant degradation in the performance (latency) and power (bandwidth).

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 7:
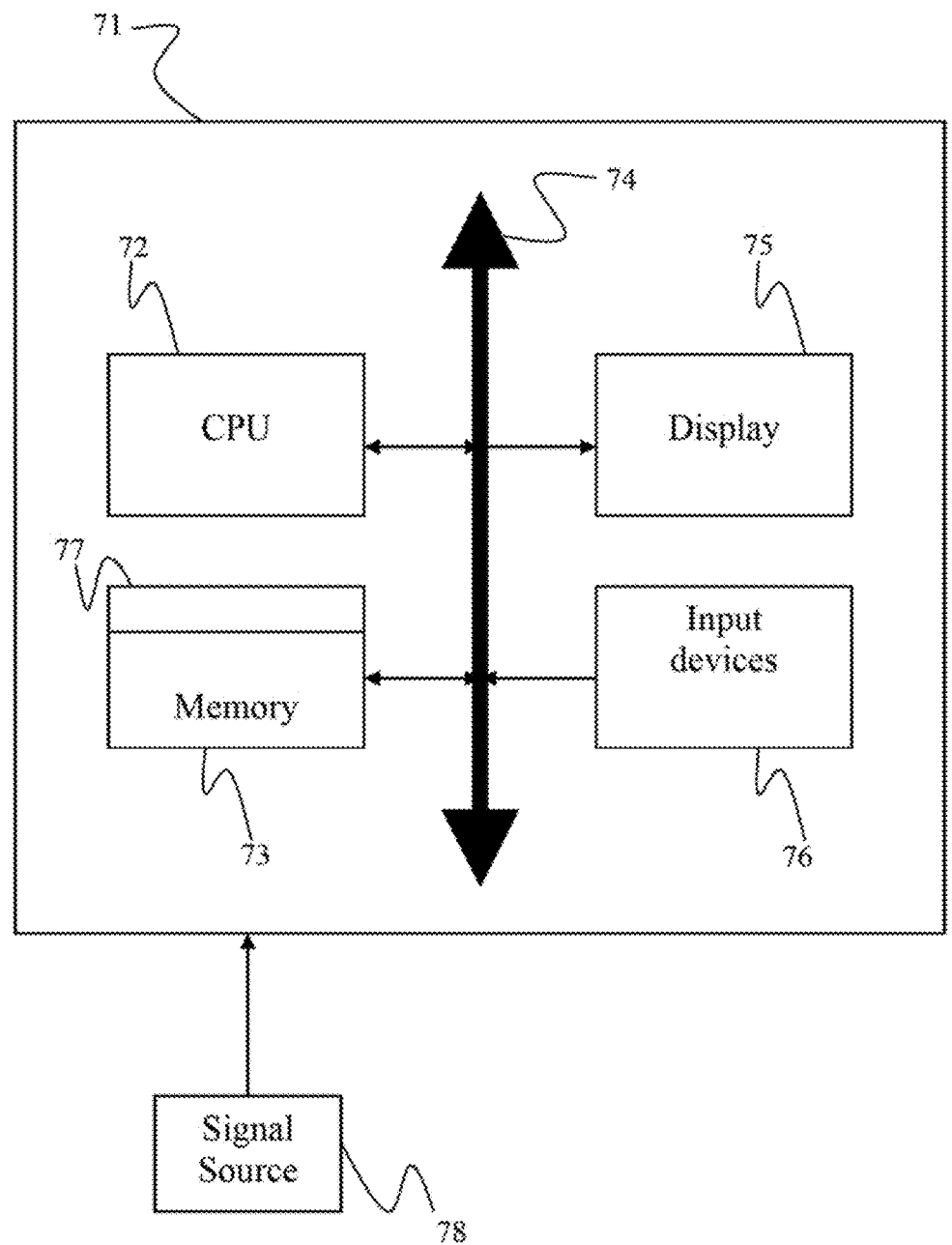
FIG. 7 is a block diagram of a system for performing data warping, according to an embodiment of the disclosure.

FIG. 7 is a block diagram of a system for performing data warping, according to an embodiment of the disclosure. Referring now to FIG. 7, a computer system 71 for implementing the present invention can comprise, inter alia, a central processing unit (CPU) or controller 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present disclosure can be implemented as a routine 77 that is stored in memory 73 and executed by the CPU or controller 72 to process the signal from the signal source 78. As such, the computer system 71 is a general purpose computer system that becomes a specific purpose computer system when executing the routine 77 of the present invention. Alternatively, as described above, embodiments of the present disclosure can be implemented as an ASIC or FPGA 77 that is in signal communication with the CPU or controller 72 to process the signal from the signal source 78.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method of warping data, comprising the steps of:

providing a set of target coordinates $\bar{x} \in \mathbb{R}^N$, wherein $\mathbb{R}$ denotes a set of real numbers, and N is an integer that is greater than 1;

calculating, by a warping engine, source coordinates $\bar{x}' \in \mathbb{R}^N$ for the target coordinates $\bar{x} \in \mathbb{R}^N$;

requesting, by the warping engine, data values for a plurality of source coordinates from a cache, wherein the plurality of source data points is a hyperrectangle of size $p_1 \times \ldots \times p_N$, $p_1, \ldots, p_N \geq 1$ centered at $\bar{x}$; and computing, by the warping engine, interpolated data values for each $\bar{x}$ in a neighborhood of $\underline{x}'$ from the data values of the source coordinates returned from the cache, wherein requesting data values from the cache comprises notifying the cache that data values for a particular group of source points of the plurality of source coordinates will be needed for computing interpolated data values for a particular target point, and fetching the data values for the particular group of source points when the data values for the particular group of source points are need for computing interpolated data values for the particular target point.

2. The method of claim 1, wherein the cache comprises a plurality of lines, and each line stores a hyperrectangle of size $n_1 \times \ldots \times n_N$ of D-dimensional data points, where D is an integer that is greater than 1, and $n_1, \ldots, n_N \geq 1$, and the cache's is fully-set-associative where each cache line can be stored in any cache location.

3. The method of claim 2, wherein requesting data values from the cache comprises:

calculating a number of cache lines K, wherein K is an integer that is greater than or equal to one and depends on a maximal size of the group of source coordinates and a cache line size $(n_1 \times \ldots \times n_N)$, for a current request;

calculating a tag for each cache line;

performing a lookup operation for each tag in a tag array of the cache, wherein it is determined whether any cache lines are missing;

using the tag for a cache line to find a corresponding location of a data value in an internal memory of the cache; and returning the data value to the warping engine.

4. The method of claim 3, further comprising:

sending physical addresses of missing cache lines to a main memory; and writing data returned from main memory to the cache's internal memory in an available cache entry according to a replacement policy.

5. The method of claim 4, further comprising comparing tags of missing cache lines to missing cache lines that have already been requested and are being retrieved, and keeping tags that correspond to lines that have already been requested in a queue, wherein the physical addresses of the missing cache-lines, for those of tags that are not in the queue, are sent to the main memory.

6. The method of claim 3, further comprising calculating a tag, when the tag is a virtual tag.

7. The method of claim 4, wherein the replacement policy is one of a first-in-first-out or a least-recently-used policy.

8. A system for warping data, comprising:

a warping engine that includes an output generator that generates a plurality of target coordinates $\bar{x} \in \mathbb{R}^N$, wherein $\mathbb{R}$ denotes a set of real numbers, and N is an integer that is greater than 1, a mapper that that calculates source coordinates $\bar{x}' \in \mathbb{R}^N$ for a plurality of target coordinates $\bar{x} \in \mathbb{R}^N$, and an interpolator that computes interpolated data values for each $\bar{x}$ in a neighborhood of $\bar{x}'$ from the data values of the source coordinates;

a cache that receives requests for data values of the source coordinates from the warping engine; and a main memory that provides data values of the source coordinates to the cache when there is a cache miss for those data values, wherein the plurality of source data points is a hyperrectangle of size $p_1 \times \ldots \times p_N$, $p_1, \ldots, p_N \geq 1$, centered at $\bar{x}'$, and wherein the cache comprises a plurality of lines, and each line stores a hyperrectangle of size $n_1 \times \ldots \times n_N$ of D-dimensional data points, where D is an integer that is greater than 1, and $n_1, \ldots, n_N \geq 1$, and the cache's is fully-set-associative where each cache line can be stored in any cache location.

9. The system of claim 8, wherein the warping engine notifies the cache that data values for a particular group of source points will be needed for computing interpolated data values for a particular target point, and fetches the data values from the cache for the particular group of source points when they are need for computing the interpolated data values for the particular target point.

10. The system of claim 8, wherein, in response to the warping engine requesting data values from the cache, the cache calculates a number of cache lines K, wherein K is an integer that is greater than or equal to one and depends on a maximal size of the group of source coordinates and a cache line size $(n_1 \times \ldots \times n_N)$, for a current request, calculates a tag for each cache line, performs a lookup operation for each tag in a tag array of the cache, wherein it is determined whether any cache lines are missing, uses the tag for a cache line to find a corresponding location of a data value in an internal memory of the cache, and returns the data value to the warping engine.

11. The system of claim 10, wherein, in response to the warping engine requesting data values from the cache, the cache sends physical addresses of missing cache lines to a main memory; and writes data returned from main memory to the cache's internal memory in an available cache entry according to a replacement policy.

12. The system of claim 11, wherein, in response to the warping engine requesting data values from the cache, the cache compares tags of missing cache lines to missing cache lines that have already been requested and are being retrieved, and keeps tags that correspond to lines that have already been requested in a queue, wherein the physical addresses of the missing cache-lines, for those of tags that are not in the queue, are sent to the main memory.

13. The system of claim 10, wherein, in response to the warping engine requesting data values from the cache, cache calculates a tag, when the tag is a virtual tag.

14. The system of claim 11, wherein the replacement policy is one of a first-in-first-out or a least-recently-used policy.

15. A non-transitory program storage device readable by a computer, tangibly embodying a program of instructions executed by the computer to perform method steps for warping data, comprising the steps of:

providing a set of target coordinates $\bar{x} \in \mathbb{R}^N$, wherein $\mathbb{R}$ denotes a set of real numbers, and N is an integer that is greater than 1;

calculating, by a warping engine, source coordinates $\bar{x}' \in \mathbb{R}^N$ for the target coordinates $\bar{x} \in \mathbb{R}^N$;

requesting, by the warping engine, data values for a plurality of source coordinates from a cache, wherein the plurality of source data points is a hyperrectangle of size $p_1 \times \ldots \times p_N$, $p_1, \ldots, p_N \geq 1$, centered at $\bar{x}$; and computing, by the warping engine, interpolated data values for each $\bar{x}$ in a neighborhood of $\bar{x}'$ from the data values of the source coordinates returned from the cache, wherein requesting data values from the cache comprises calculating a number of cache lines K, wherein K is an integer that is greater than or equal to one and depends on a maximal size of the group of source coordinates and a cache line size $(n_1 \times \ldots \times n_N)$, for a current request; calculating a tag for each cache line; comparing tags of missing cache lines to missing cache lines that have already been requested and are being retrieved, and keeping tags that correspond to lines that have already been requested in a queue, wherein the physical addresses of the missing cache-lines, for those of tags that are not in the queue, are sent to the main memory.

16. The computer readable program storage device of claim 15, wherein the cache comprises a plurality of lines, and each line stores a hyperrectangle of size $n_1 \times \ldots \times n_N$ of D-dimensional data points, where D is an integer that is greater than 1, and $n_1, \ldots, n_N \geq 1$, and the cache's is fully-set-associative where each cache line can be stored in any cache location.

17. The computer readable program storage device of claim 15, wherein requesting data values from the cache further comprises:

performing a lookup operation for each tag in a tag array of the cache, wherein it is determined whether any cache lines are missing;

using the tag for a cache line to find a corresponding location of a data value in an internal memory of the cache; and returning the data value to the warping engine.

18. The computer readable program storage device of claim 17, the method further comprising:

sending physical addresses of missing cache lines to a main memory; and writing data returned from main memory to the cache's internal memory in an available cache entry according to a replacement policy, wherein the replacement policy is one of a first-in-first-out or a least-recently-used policy.

19. The computer readable program storage device of claim 15, the method further comprising notifying the cache that data values for a particular group of source points will be needed for computing interpolated data values for a particular target point, and fetching the data values for the particular group of source points when they are need for computing interpolated data values for the particular target point.

* * * * *